(12) United States Patent
Takatani et al.

(10) Patent No.: US 10,147,552 B2
(45) Date of Patent: Dec. 4, 2018

(54) CONDUCTIVE POLYMER PARTICLE DISPERSION, ELECTROLYTIC CAPACITOR USING SAME, AND METHOD OF PRODUCING THESE

(71) Applicant: Panasonic Intellectual Property Management Co., Ltd., Osaka (JP)

(72) Inventors: Kazuhiro Takatani, Yamaguchi (JP); Tatsuji Aoyama, Yamaguchi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 78 days.

(21) Appl. No.: 14/859,234

(22) Filed: Sep. 18, 2015

(65) Prior Publication Data

US 2016/0012973 A1 Jan. 14, 2016

Related U.S. Application Data

(63) Continuation of application No. PCT/JP2013/002153, filed on Mar. 29, 2013.

(51) Int. Cl.
*H01G 9/028* (2006.01)
*C08G 61/12* (2006.01)
(Continued)

(52) U.S. Cl.
CPC ........... *H01G 9/028* (2013.01); *C08G 61/126* (2013.01); *C08L 65/00* (2013.01); *H01G 9/0032* (2013.01);
(Continued)

(58) Field of Classification Search
CPC ........ H01G 9/028; H01G 9/15; H01G 9/0032; H01G 9/145; H01G 9/45; H01G 9/012; H01G 9/022
See application file for complete search history.

(56) References Cited

U.S. PATENT DOCUMENTS 6,229,689 B1 * 5/2001 Kobayashi ............. H01G 9/025
252/62.2
6,614,063 B2 * 9/2003 Hayashi ............... H01G 9/0029
257/213
(Continued)

FOREIGN PATENT DOCUMENTS

JP WO2005082783 * 9/2005
JP 2007-103558 4/2007
(Continued)

OTHER PUBLICATIONS

International Search Report of PCT application No. PCT/JP2013/002153 dated Jul. 2, 2013.
(Continued)

*Primary Examiner* — Nguyen Ha
(74) *Attorney, Agent, or Firm* — McDermott Will & Emery LLP

(57) ABSTRACT

A conductive polymer microparticle dispersion contains a solvent, and polythiophene microparticles dispersed in the solvent. The polymerization unit of the polythiophene is one of thiophene and derivatives thereof, and the polythiophene contains a polyanion as a dopant. The conductive polymer microparticle dispersion has a pH value of 3 or greater and contains a solvent-insoluble iron compound containing iron with a concentration of 450 ppm or less.

17 Claims, 2 Drawing Sheets

(51) Int. Cl.
      *C08L 65/00*      (2006.01)
      *H01G 9/00*       (2006.01)
      *H01G 9/15*       (2006.01)

(52) U.S. Cl.
      CPC ............ *H01G 9/0036* (2013.01); *H01G 9/15* (2013.01); *H01G 9/151* (2013.01)

(56) References Cited

U.S. PATENT DOCUMENTS

| | | | | |
|---|---|---|---|---|
| 2012/0251919 A1* | 10/2012 | Nakamura | ............. | C08G 61/10 |
| | | | | 429/482 |
| 2013/0059064 A1* | 3/2013 | Majima | ................ | H01G 9/0029 |
| | | | | 427/80 |
| 2014/0022706 A1* | 1/2014 | Sugawara | .................. | C08J 3/05 |
| | | | | 361/527 |

FOREIGN PATENT DOCUMENTS

| | | |
|---|---|---|
| JP | 2007-184318 | 7/2007 |
| JP | 2008-222850 | 9/2008 |
| JP | 2009-221417 | 10/2009 |
| JP | 2012-222146 | 11/2012 |
| WO | 2012/132248 | 10/2012 |

OTHER PUBLICATIONS

English Translation of Chinese Search Report dated Aug. 10, 2016 for the related Chinese Patent Application No. 201380075238.4.

\* cited by examiner

CONDUCTIVE POLYMER PARTICLE DISPERSION, ELECTROLYTIC CAPACITOR USING SAME, AND METHOD OF PRODUCING THESE

BACKGROUND

1. Technical Field

The present disclosure relates to a conductive polymer microparticle dispersion applicable to an antistatic agent, an electrolyte for an electrolytic capacitor, a display element, and others. The present disclosure also relates to an electrolytic capacitor formed by using the conductive polymer microparticle dispersion. The present disclosure further relates to methods of manufacturing the dispersion and the capacitor.

2. Description of Related Art

Dopant-containing polymers having a π-conjugated structure are known to have high conductivity. Dopants are substances to develop conductivity. These polymers are used in antistatic agents, display elements, etc. because of their chemical and physical stability in addition to their high conductivity. They have also been suggested to be used in solid electrolytes for electrolytic capacitors.

One known process of manufacturing such a conductive polymer having a π-conjugated structure is to oxidatively polymerize a monomer with an oxidizing agent in the presence of a dopant. For example, the use of 3,4-ethylenedioxythiophene as a monomer, and a polystyrene sulfonic acid as the dopant results in highly conductive poly3,4-ethylenedioxythiophene doped with the polystyrene sulfonic acid. The poly3,4-ethylenedioxythiophene prepared by this method is in the form of microparticles dispersed in water. Thus, the above-described method can prepare a conductive polymer microparticle dispersion (see, for example, Japanese Unexamined Patent Publication No. 2008-222850).

SUMMARY

The conductive polymer microparticle dispersion of the present disclosure contains a solvent, and polythiophene microparticles dispersed in the solvent. A polymerization unit of the polythiophene is one of thiophene and derivatives thereof and the polythiophene contains a polyanion as a dopant. The conductive polymer microparticle dispersion has a pH value of 3 or greater and contains a solvent-insoluble iron compound containing iron with a concentration of 450 ppm or less.

This conductive polymer microparticle dispersion is prepared by oxidatively polymerizing one of thiophene and derivatives thereof with an oxidizing agent in the presence of a polyanion in a solvent. The oxidizing agent used here produces iron ions. The pH value of the conductive polymer microparticle dispersion is adjusted to 3 or greater. The conductive polymer microparticle dispersion prepared as described hereinbefore contains a solvent-insoluble iron compound containing iron with a concentration of 450 ppm or less.

Using the conductive polymer microparticle dispersion as a material of a solid electrolyte for an electrolytic capacitor prevents a decrease in the initial capacity and an increase in the leakage current of the capacitor. As a result, the capacitor has a long life and a low ESR.

DETAILED DESCRIPTION OF PREFERRED EMBODIMENTS

It is possible to obtain a conductive polymer by removing the solvent component from the conductive polymer microparticle dispersion prepared by the above-described conventional method. However, when this conductive polymer is used in a solid electrolyte for an electrolytic capacitor, the electrolytic capacitor may have high ESR depending on the method and conditions of forming a conductive polymer film. Therefore, when a conductive polymer microparticle dispersion having a π-conjugated structure is used as a solid electrolyte for an electrolytic capacitor, it is not enough to optimize the method and conditions of forming the conductive polymer film, and it is crucial to make the dispersion suitable for use in the solid electrolyte.

Figure 1:
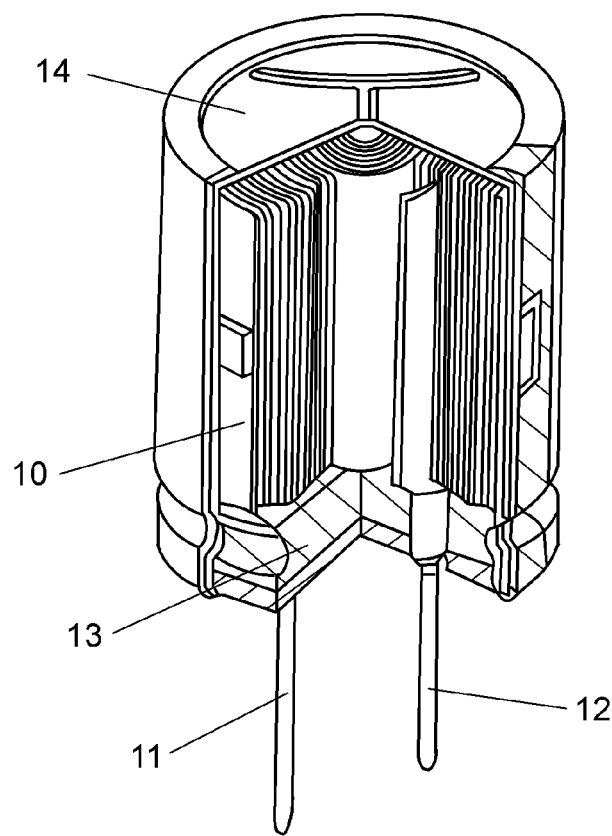
FIG. 1 is a partially cutaway schematic perspective view of an electrolytic capacitor formed by using a conductive polymer microparticle dispersion prepared by the method according to an exemplary embodiment of the present disclosure.
Figure 2:
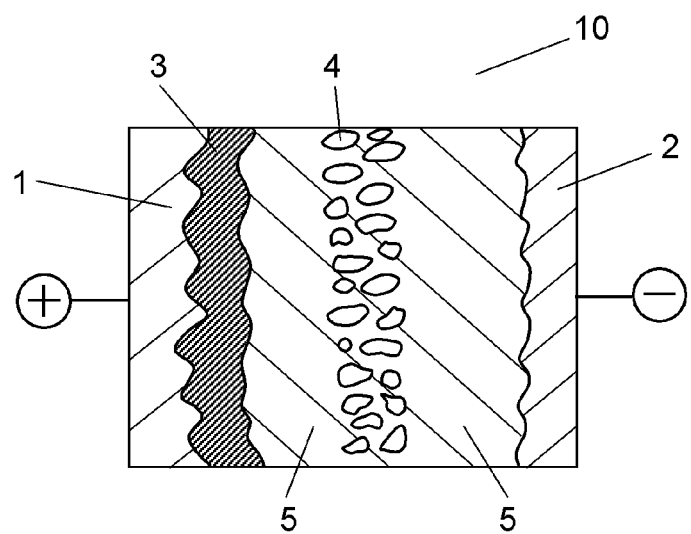
FIG. 2 is a partial sectional view of a capacitor element contained in the electrolytic capacitor shown in FIG. 1.

An exemplary embodiment of the present disclosure will now be described with reference to FIGS. 1 and 2. FIG. 1 is a partially cutaway perspective view of an electrolytic capacitor manufactured by using a conductive polymer microparticle dispersion prepared by the method according to the exemplary embodiment of the present disclosure. FIG. 2 is a partial sectional view of a capacitor element contained in the electrolytic capacitor shown in FIG. 1.

As shown in FIG. 1, the electrolytic capacitor includes capacitor element 10, metal case 14, and sealing member 13. Case 14 houses capacitor element 10, and sealing member 13 seals the opening of case 14. Thus, case 14 and sealing member 13 together form an outer body which seals capacitor element 10.

As shown in FIG. 2, capacitor element 10 includes positive electrode 1, negative electrode 2, separator 4, and solid electrolyte layer 5. Separator 4 and solid electrolyte layer 5 are interposed between positive electrode 1 and negative electrode 2. Positive electrode 1 is made of an aluminum foil whose surface is etched to roughen it first and then subjected to a chemical conversion treatment to form dielectric oxide film layer 3. Negative electrode 2 is also made of an aluminum foil whose surface is etched to roughen it. Positive electrode 1 and negative electrode 2 are connected to lead terminals 11 and 12, respectively, as shown in FIG. 1. Lead terminals 11 and 12 are led out through sealing member 13.

In capacitor element 10, positive electrode 1 and negative electrode 2 are wound with separator 4 interposed therebetween. Capacitor element 10 is impregnated with an aftermentioned conductive polymer microparticle dispersion, and then dried to remove the solvent component so as to form conductive polymer solid electrolyte layer 5 between positive electrode 1 and negative electrode 2.

The following is a brief description of a method of manufacturing a conductive polymer microparticle dispersion (hereinafter, referred to simply as "dispersion") used for solid electrolyte layer 5. First, a dispersion liquid is prepared by dispersing, in a water-based solvent, at least one monomer selected from thiophenes and their derivatives, and at least one polyanion selected as a dopant from polyanions.

Next, the dispersion liquid is mixed with an oxidizing agent that contains a first oxidizing agent producing iron ions in the solvent so as to oxidatively polymerize the monomer. The result is a conductive polythiophene dispersion doped with the polyanion.

The polythiophene dispersion is washed to reduce unnecessary components contained therein, and then the pH value of the polythiophene dispersion is adjusted to 3 or greater. This results in the conductive polymer microparticle dispersion (the dispersion). The dispersion contains solvent-insoluble iron compounds containing iron with a concentration of 450 ppm or less. In the case of containing only a small amount of unnecessary components, the polythiophene dispersion does not have to be washed. Thus, washing is not an essential process.

As described above, the conductive polymer microparticle dispersion (the dispersion) of the exemplary embodiment contains a water-based solvent, and polythiophene microparticles dispersed in the solvent. The polymerization unit of the polythiophene is at least one selected from thiophenes and their derivatives and the polythiophene contains a polyanion as a dopant. The dispersion has a pH value of not less than 3 and contains solvent-insoluble iron compounds containing iron with a concentration of not more than 450 ppm.

The thiophenes and their derivatives applicable as the monomer have a $\pi$-conjugated structure. Examples of this monomer include the following: thiophene, 3-methylthiophene, 3-ethylthiophene, 3-propylthiophene, 3-butylthiophene, 3-hexylthiophene, 3-heptylthiophene, 3-octylthiophene, 3-nonylthiophene, 3-decylthiophene, 3-methoxythiophene, 3-ethoxythiophene, 3-butoxythiophene, 3-methyl-4-methoxythiophene, 3,4-ethylenedioxythiophene, benzothiophene, and benzodithiophene. Among them, 3,4-ethylenedioxythiophene is especially preferable because it can be polymerized at a moderate rate and can also provide the resultant polymer with high heat resistance.

The polyanions that can be used as the dopant include the following: polyvinyl sulfonic acid, polystyrene sulfonic acid, polyacrylic sulfonic acid, polyacrylamide tertiary butylsulfonic acid, polyacrylic acid, polymethacryl acid, polymaleic acid, copolymers containing these structural units, and the ammonium, lithium, and sodium salts of these polyanions. Among them, polystyrene sulfonic acid is especially preferable because of its excellent dispersibility and heat resistance. These polyanions may be used alone or in combination of two or more.

The weight-average molecular weight of the polyanions is preferably 10000 to 400000, inclusive, more preferably 30000 to 200000, inclusive, and most preferably 50000 to 100000, inclusive. The number-average molecular weight of the polyanions is preferably 1000 to 300000, inclusive, more preferably 10000 to 150000, inclusive, and most preferably 20000 to 100000, inclusive.

Examples of the first oxidizing agent which produces iron ions in the solvent include the following: iron salts of inorganic acids such as iron chloride (III), iron sulfate (III), and iron nitrate (III); and iron salts of organic acids such as iron methoxybenzenesulfonate and iron toluenesulfonate. Among them, iron sulfate (III) is particularly preferable because it can allow the monomer to be polymerized at a moderate rate and can also provide the resultant polymer with high heat resistance. Iron sulfate (III) is hereinafter referred to as ferric sulfate.

The first oxidizing agent is used together with a second oxidizing agent not producing iron ions in a solvent. Examples of the second oxidizing agent include the following: hydrogen peroxide, persulfate, permanganate, benzoyl peroxide, and ozone. Among them, ammonium persulfate is especially preferably because of the following features: it can be kept for a long period, be easy to care for, allow the monomer to be polymerized at a moderate rate, and also provide the resultant polymer with high heat resistance.

It is preferable that the water to be used as the solvent be ion exchange water or distilled water because of their low impurity content. The solvent is water-based, which means that the solvent consists of about 95% or more of water and only trace amounts of impurities or additives.

The following is a description of how to prepare the dispersion liquid. The monomer and the polyanion are added at the same time to the water in a container under shear stress applied by a dispersing machine. Alternatively, the monomer and the polyanion may be added sequentially to the water in the container under shear stress applied by the dispersing machine. Further alternatively, the monomer and the polyanion may be added to the water in the container first, and then be exposed to shear stress applied by the dispersing machine. Examples of the dispersing machine include a homomixer and a high-pressure homogenizer.

Adding the monomer and the polyanion at the same time to the water takes less time for dispersion than adding them sequentially. Instead of adding the monomer first and then the polyanion, the polyanion can be added first and then the monomer. Furthermore, some of the water may be placed in the container before adding the monomer and the polyanion, and then the remaining water may be added in a plurality of batches during dispersion.

The objective of these operations is to disperse the monomer having a hydrophobic $\pi$-conjugated structure into water by making it in the form of microparticles, and these operations are not the only possible approaches. In the case of using a solid or viscous polyanion, it can be dissolved or diluted in water and be used as an aqueous solution.

The preferable water content is 9 parts by weight or more with respect to 1 part by weight of the monomer. When the water content is less than this amount, the dispersion liquid may become too viscous during the polymerization, possibly making it impossible to obtain a uniform conductive polymer microparticle dispersion.

The preferable polyanion content is 1 to 5 parts by weight, inclusive with respect to 1 part by weight of the monomer. When the polyanion content is less than 1 part by weight, the resultant conductive polymer has a low conductivity. When, on the other hand, the polyanion content is more than 5 parts by weight, the conductivity of the resultant conductive polymer hardly increases. As a result, considering the material cost, it is preferable to use 5 parts by weight or less of the polyanion.

The monomer is oxidatively polymerized in the following manner. An oxidizing agent is added to the above-prepared dispersion liquid under shear stress applied by a dispersing machine. In the case of using a solid or viscous oxidizing agent, it can be dissolved or diluted in water and be used as an aqueous solution. Thus, the monomer in a dispersed state is oxidatively polymerized to form a polymer (hereinafter, polythiophene) in the form of microparticles. The monomer is kept under shear stress applied by the dispersing machine even after the oxidizing agent is added until the polymerization is over. As a result, a polythiophene dispersion doped with the polyanion is completed. The dispersion liquid and the oxidizing agent may be put into separate devices before the oxidatively polymerizing of the monomer. Thus, how to oxidatively polymerize the monomer is not particularly limited as long as the dispersion liquid and the oxidizing agent are mixed with each other.

During dispersion and polymerization, the dispersion liquid and the dispersion preferably be at a temperature in the range of 5 to 10° C., inclusive, so as to react at an appropriate rate.

The polyanion-doped polythiophene dispersion thus prepared is washed to reduce unnecessary components. Specifically, first of all, after polymerization, the dispersion is diluted by adding either water or a cleaning liquid containing water and either acid or alkali to make it acid or alkaline. Next, the solvent in the dispersion is removed from the polyanion-doped polythiophene and insoluble components by filtering, centrifuging, or other methods of separation. This operation is repeated several times.

Next, the concentration of the polyanion-doped polythiophene in the dispersion is adjusted, and the pH value of the dispersion is adjusted to not less than 3. More specifically, either water or an acid or alkali solvent containing water and either acid or alkali is added to the polyanion-doped polythiophene and the insoluble components. As a result of this operation, the concentration of the polyanion-doped polythiophene is adjusted, and the pH value of the dispersion is adjusted to not less than 3.

The concentration of iron contained in the iron compounds insoluble in the water-based solvent is adjusted to not more than 450 ppm in the dispersion. This concentration is achieved by adjusting the types and amounts of the materials as well as the dispersing, polymerizing, and washing conditions.

The washing and pH adjustment operations may be omitted if all of the following conditions are satisfied at the completion of the polymerization: there is no need to remove unnecessary components in the dispersion; the pH value of the dispersion is not less than 3; and the concentration of iron contained in the solvent-insoluble iron compounds is not more than 450 ppm. Similarly, the pH adjustment operation may be omitted if both of the following conditions are satisfied at the completion of the washing operation: the pH value of the dispersion is not less than 3; and the concentration of iron contained in the solvent-insoluble iron compounds is not more than 450 ppm.

It is preferable that the iron compounds insoluble in the water-based solvent be at least one of iron hydroxide and iron oxyhydroxide. This reduces the viscosity increase of the dispersion more effectively than the other solvent-insoluble iron compounds. Therefore, solid electrolyte layer 5 of the electrolytic capacitor formed with this dispersion allows the polythiophene as the solid electrolyte to be tightly bonded to the positive and negative electrodes, thereby further extracting the capacity of the capacitor.

It is also preferable that the concentration of iron contained in the solvent-insoluble iron compounds be in the range of 20 to 450 ppm, inclusive. Accordingly, solid electrolyte layer 5 of the electrolytic capacitor formed with this dispersion allows the polythiophene as the solid electrolyte to be tightly bonded to the positive and negative electrodes due to the presence of iron, thereby further extracting the capacity of the capacitor.

Effects of the exemplary embodiment will now be described with reference to specific examples.

Example 1

First, as a monomer having a π-conjugated structure, 1 part by weight of 3,4-ethylenedioxythiophene is added to distilled water in a container. Next, as a polyanion, a 2.15 parts by weight of polystyrene sulfonic acid is added thereto in a form of aqueous solution. Then the resultant mixture is exposed to shear stress applied by a homomixer for ten minutes to prepare a dispersion liquid of 3,4-ethylenedioxythiophene.

While the dispersion liquid is under shear stress applied by the homomixer, 1 part by weight of ferric sulfate is added in a form of aqueous solution as the oxidizing agent producing iron ions, and immediately after this, 2.1 parts by weight of ammonium persulfate is added in a form of aqueous solution as the oxidizing agent used together with the oxidizing agent producing iron ions. The distilled water content used so far is 210 parts by weight. After the addition of these oxidizing agents, shear stress is applied for 24 consecutive hours by the homomixer and then the polymerization is terminated. Thus, the dispersion is completed.

Next, the dispersion is filtered through a filtration device so as to concentrate the solid content, and the concentrated dispersion is diluted by adding distilled water thereto. The series of concentrating and diluting operations is performed twice.

Then, sulfuric acid and distilled water are added to the washed dispersion so as to adjust the pH value of the dispersion to 3.

The concentration of iron contained in the solvent-insoluble iron compounds is confirmed as follows. Sulfuric acid is added to the residue, which is obtained by the filtration of the dispersion and is mainly formed of conductive polymer microparticles. As a result, the iron contained in the residue is dissolved in a solution. Next, the solution is subjected to quantitative analysis by atomic adsorption spectrometry. In example 1, the concentration of iron contained in the solvent-insoluble iron compounds is 203 ppm.

Example 2

In example 2, a dispersion is prepared in the same manner as in example 1 except for the following: the series of concentrating and diluting operations of the dispersion is performed one more time; and sulfuric acid and distilled water are added to the washed dispersion so as to adjust the pH value to 5. The concentration of iron contained in the solvent-insoluble iron compounds is 260 ppm.

Example 3

In example 3, a dispersion is prepared in the same manner as in example 1 except for the following: the series of concentrating and diluting operations of the dispersion is performed one more time; and ammonia water and distilled water are added to the washed dispersion so as to adjust the pH value to 7. The concentration of iron contained in the solvent-insoluble iron compounds is 268 ppm.

Example 4

In example 4, a dispersion is prepared in the same manner as in example 1 except for the following: the series of concentrating and diluting operations of the dispersion is performed two more times; and ammonia water and distilled water are added to the washed dispersion so as to adjust the pH value to 9. The concentration of iron contained in the solvent-insoluble iron compounds is 265 ppm.

Example 5

In example 5, a dispersion is prepared in the same manner as in example 1 except for the following: the series of concentrating and diluting operations of the dispersion is performed two more times; and sodium hydroxide and distilled water are added to the washed dispersion so as to adjust the pH value to 11. The concentration of iron contained in the solvent-insoluble iron compounds is 271 ppm.

Example 6

A dispersion is prepared by oxidatively polymerizing a dispersion liquid prepared in the same manner as in example 1 except for using the following materials in the following proportions: 1 part by weight of 3,4-ethylenedioxythiophene; 2.15 parts by weight of polystyrene sulfonic acid; 1 part by weight of ferric sulfate; 2.1 parts by weight of ammonium persulfate; and 130 parts by weight of distilled water.

This dispersion is filtered through a filtration device so as to concentrate the solid content, and the concentrated dispersion is diluted by adding distilled water thereto. The series of concentrating and diluting operations is performed twice. Next, sulfuric acid and distilled water are added to the washed dispersion so as to adjust the pH value to 3. The concentration of iron contained in the solvent-insoluble iron compounds is 359 ppm.

Example 7

In example 7, a dispersion is prepared in the same manner as in example 6 except for the following: the series of concentrating and diluting operations of the dispersion is performed one more time; and sulfuric acid and distilled water are added to the washed dispersion so as to adjust the pH value to 5. The concentration of iron contained in the solvent-insoluble iron compounds is 407 ppm.

Example 8

In example 8, a dispersion is prepared in the same manner as in example 6 except for the following: the series of concentrating and diluting operations of the dispersion is performed one more time; and ammonia water and distilled water are added to the washed dispersion so as to adjust the pH value to 7. The concentration of iron contained in the solvent-insoluble iron compounds is 450 ppm.

Example 9

A dispersion is prepared by oxidatively polymerizing a dispersion liquid prepared in the same manner as in example 1 except for using the following materials in the following proportions: 1 part by weight of 3,4-ethylenedioxythiophene; 2.15 parts by weight of polystyrene sulfonic acid; 1 part by weight of ferric sulfate; 2.1 parts by weight of ammonium persulfate; and 110 parts by weight of distilled water.

This dispersion is washed in the same manner as in example 1. Next, sulfuric acid and distilled water are added to the washed dispersion so as to adjust the pH value to 3. The concentration of iron contained in the solvent-insoluble iron compounds is 421 ppm.

Example 10

A dispersion is prepared by oxidatively polymerizing a dispersion liquid prepared in the same manner as in example 1 except for using the following materials in the following proportions: 1 part by weight of 3,4-ethylenedioxythiophene; 2.15 parts by weight of polystyrene sulfonic acid; 1 part by weight of ferric sulfate; 2.1 parts by weight of ammonium persulfate; and 2000 parts by weight of distilled water.

This dispersion is filtered through a filtration device so as to concentrate the solid content, and the concentrated dispersion is diluted by adding distilled water thereto. The series of concentrating and diluting operations is performed twice. Next, sulfuric acid and distilled water are added to the washed dispersion so as to adjust the pH value to 5. The concentration of iron contained in the solvent-insoluble iron compounds is 5 ppm.

Example 11

A dispersion is prepared by oxidatively polymerizing a dispersion liquid prepared in the same manner as in example 1 except for using the following materials in the following proportions: 1 part by weight of 3,4-ethylenedioxythiophene; 2.15 parts by weight of polystyrene sulfonic acid; 1 part by weight of ferric sulfate; 2.1 parts by weight of ammonium persulfate; and 2000 parts by weight of distilled water. This dispersion is filtered through a filtration device so as to concentrate the solid content, and the concentrated dispersion is diluted by adding distilled water thereto. The series of concentrating and diluting operations is performed twice. Next, sulfuric acid and distilled water are added to the washed dispersion so as to adjust the pH value to 5. The concentration of iron contained in the solvent-insoluble iron compounds is 3 ppm.

The following is a description of Comparative Examples.

Comparative Example 1

First, a dispersion is prepared by oxidatively polymerizing a dispersion liquid that is prepared using the same materials in the same proportions as in example 1. This dispersion is filtered through a filtration device so as to concentrate the solid content, and the concentrated dispersion is diluted by adding distilled water thereto. Next, sulfuric acid and distilled water are added to the washed dispersion so as to adjust the pH value to 2. The concentration of iron contained in the solvent-insoluble iron compounds is 86 ppm.

Comparative Example 2

First, a dispersion is prepared by oxidatively polymerizing a dispersion liquid that is prepared using the same materials in the same proportions as in example 6. This dispersion is filtered through a filtration device so as to concentrate the solid content, and the concentrated dispersion is diluted by adding distilled water thereto. Next, sulfuric acid and distilled water are added to the washed dispersion so as to adjust the pH value to 2. The concentration of iron contained in the solvent-insoluble iron compounds is 143 ppm.

Comparative Example 3

First, a dispersion is prepared by oxidatively polymerizing a dispersion liquid that is prepared using the same materials in the same proportions as in example 6. The series of concentrating and diluting operations is performed one more time. Next, ammonia water and distilled water are added to the washed dispersion so as to adjust the pH value to 8. The concentration of iron contained in the solvent-insoluble iron compounds is 475 ppm.

Comparative Example 4

First, a dispersion is prepared by oxidatively polymerizing a dispersion liquid that is prepared using the same materials in the same proportions as in example 6. The series of concentrating and diluting operations is performed two more times. Next, sodium hydroxide and distilled water are added to the washed dispersion so as to adjust the pH value to 11. The concentration of iron contained in the solvent-insoluble iron compounds is 486 ppm.

Comparative Example 5

First, a dispersion is prepared by oxidatively polymerizing a dispersion liquid that is prepared using the same materials in the same proportions as in example 9. This dispersion is filtered through a filtration device so as to concentrate the solid content, and the concentrated dispersion is diluted by adding distilled water thereto. Next, sulfuric acid and distilled water are added to the washed dispersion so as to adjust the pH value to 2. The concentration of iron contained in the solvent-insoluble iron compounds is 171 ppm.

Comparative Example 6

First, a dispersion is prepared by oxidatively polymerizing a dispersion liquid that is prepared using the same materials in the same proportions as in example 9. This dispersion is filtered through a filtration device so as to concentrate the solid content, and the concentrated dispersion is diluted by adding distilled water thereto. The series of concentrating and diluting operations is performed twice. Next, sulfuric acid and distilled water are added to the washed dispersion so as to adjust the pH value to 4. The concentration of iron contained in the solvent-insoluble iron compounds is 504 ppm.

Comparative Example 7

First, a dispersion is prepared by oxidatively polymerizing a dispersion liquid that is prepared using the same materials in the same proportions as in example 9. The series of concentrating and diluting operations of the dispersion is performed two more times in total. Next, sodium hydroxide and distilled water are added to the washed dispersion so as to adjust the pH value to 11. The concentration of iron contained in the solvent-insoluble iron compounds is 580 ppm.

The dispersions thus prepared in the Examples and the Comparative Examples are used to manufacture electrolytic capacitors having a rated voltage of 35 V and a capacitance of 47 µF. The electrolytic capacitors have property target values: a capacitance of 47 µF±20%; and a leakage current upper limit of 16.45 µA.

Table 1 shows the measurement results of the initial characteristics of the capacitance and leakage current of electrolytic capacitors manufactured using dispersions prepared in the Examples and the Comparative Examples.

TABLE 1

| | conductive polymer microparticle dispersions | | initial characteristics of electrolytic capacitors | |
|---|---|---|---|---|
| | pH | concentration of iron contained in the solvent-insoluble iron compound (ppm) | capacitance (µF) | leakage current (µA) |
| Example 1 | 3 | 203 | 46.2 | 1.3 |
| Example 2 | 5 | 260 | 46.0 | 1.0 |
| Example 3 | 7 | 268 | 46.3 | 1.3 |
| Example 4 | 9 | 265 | 46.3 | 1.1 |
| Example 5 | 11 | 271 | 46.1 | 1.1 |
| Example 6 | 3 | 359 | 46.2 | 1.3 |
| Example 7 | 5 | 407 | 46.2 | 1.4 |
| Example 8 | 7 | 450 | 46.3 | 1.0 |
| Example 9 | 3 | 421 | 45.9 | 1.5 |
| Example 10 | 5 | 5 | 46.0 | 1.1 |
| Example 11 | 5 | 3 | 42.0 | 1.2 |
| Comparative Example 1 | 2 | 86 | 46.3 | 18.2 |
| Comparative Example 2 | 2 | 143 | 46.1 | 52.1 |
| Comparative Example 3 | 8 | 475 | 36.5 | 1.1 |
| Comparative Example 4 | 11 | 486 | 35.2 | 1.2 |
| Comparative Example 5 | 2 | 171 | 46.0 | 100.2 |
| Comparative Example 6 | 4 | 504 | 31.2 | 1.2 |
| Comparative Example 7 | 11 | 580 | 9.8 | 1.3 |

As shown in Table 1, in Examples 1-11, the dispersions have pH values of 3 or greater and contain solvent-insoluble iron compounds containing iron with concentrations of 450 ppm or less. The capacitances are in the range of 42.0 to 46.3 µF, which fall within the target range of 47 µF±20%, and the leakage currents are in the range of 1.0 to 1.5 µA, which also fall within the target upper limit of 16.45 µA.

In Comparative Examples 1, 2, and 5, on the other hand, the dispersions have pH values of 2 and contain solvent-insoluble iron compounds containing iron with concentrations of 86 ppm, 143 ppm, 171 ppm, respectively. The capacitances in Comparative Examples 1, 2, and 5, are 46.3 µF, 46.1 µF, and 46.0 µF, respectively, which fall within the target range of 47 µF±20%. The leakage currents in Comparative Examples 1, 2, and 5, however, are 18.2 µA, 52.1 µA, and 100.2 µA, respectively, which far exceed the target upper limit of 16.45 µA. The reason of the extremely large leakage currents in Comparative Examples 1, 2, and 5 is considered that the strong acid (pH 2) of the dispersion makes the chemical conversion film likely to be partially damaged.

In Comparative Examples 3, 4, 6, and 7, the dispersions have pH values of not less than 3 and contain solvent-insoluble iron compounds containing iron with concentrations of 475 ppm, 486 ppm, 504 ppm, and 580 ppm, respectively. The leakage currents in Comparative Examples 3, 4, 6, and 7 are 1.1 µA, 1.2 µA, 1.2 µA, and 1.3 µA, respectively, which fall within the target upper limit of 16.45 µA. The capacitances in Comparative Examples 3, 4, 6, and 7, however, are 36.5 µF, 35.2 µF, 31.2 µF, and 9.8 µF, which are far below the target range of 47 µF±20%.

The concentration of iron contained in the solvent-insoluble iron compounds is proportional to the concentration of the solvent-insoluble iron compounds. As the concentration of the solvent-insoluble iron compounds increase, the solvent-insoluble iron compounds clog pits formed by etching the surface of each of positive electrode 1 and negative electrode 2. This is considered to be the reason why Comparative Examples 3, 4, 6, and 7 have too small capacitances to achieve the values within the target range.

As described hereinbefore, the conductive polymer microparticle dispersions of the exemplary embodiment are prepared by oxidatively polymerizing, in a water-based solvent, a monomer with an oxidizing agent in the presence of a dopant. The monomer is at least one selected from thiophenes and their derivatives, and the dopant is at least one polyanion selected from polyanions. The oxidizing agent used here produces iron ions. Thus, this dispersion contains a polyanion-doped polythiophene in the form of conductive polymer microparticles. The dispersion has a pH value of 3 or greater and contains solvent-insoluble iron compounds containing iron with a concentration of 450 ppm or less.

Using this dispersion as a material of a solid electrolyte for an electrolytic capacitor allows the capacitor to have a low ESR and a long life without sacrificing the capacitance or increasing the leakage current.

The exemplary embodiment has described a wound solid electrolytic capacitor containing aluminum foils as electrodes, but the present disclosure is not limited to this configuration. The conductive polymer microparticle dispersions manufactured according to the method of the present exemplary embodiment can be applied, for example, to the following capacitors: a wound solid electrolytic capacitor including an electrode made of valve metal foil other than aluminum; a stacked type; a type including a positive electrode made of a sintered valve metal; and a hybrid type containing both a solid electrolyte and an electrolytic solution.

The materials, manufacturing methods, and evaluation techniques described in Examples 1 to 11 are mere examples and do not limit the present disclosure thereto.

The present disclosure is useful for an electrolytic capacitor including a conductive polymer microparticle dispersion.

What is claimed is:

1. A conductive polymer microparticle dispersion comprising:
    a solvent; and
    polythiophene microparticles dispersed in the solvent and containing, as a polymerization unit, one of thiophene and derivatives thereof, and a polyanion as a dopant, wherein
    the conductive polymer microparticle dispersion has a pH value of 3 or greater, and contains an iron compound insoluble in the solvent,
    the iron compound contains iron, and
    a concentration of the iron in the conductive polymer microparticle dispersion is 450 ppm or less.

2. The conductive polymer microparticle dispersion according to claim 1, wherein:
    the solvent includes water, and
    the iron compound insoluble in the solvent includes at least one of iron hydroxide and iron oxyhydroxide.

3. An electrolytic capacitor, comprising:
    a capacitor element including a positive electrode, a dielectric oxide film layer formed on the positive electrode, and a conductive polymer solid electrolyte layer formed on the dielectric oxide film layer; and
    an outer body sealing the capacitor element,
    wherein the solid electrolyte layer comprises the polythiophene microparticles contained in the conductive polymer microparticle dispersion of claim 1.

4. The electrolytic capacitor according to claim 3, wherein the concentration of the iron is in a range from 20 ppm to 450 ppm, inclusive.

5. The conductive polymer microparticle dispersion according to claim 1, wherein the concentration of the iron is in a range from 20 ppm to 450 ppm, inclusive.

6. A method of manufacturing a conductive polymer microparticle dispersion, the method comprising:
    preparing a monomer dispersion including one of thiophene and derivatives thereof, a polyanion, and a solvent;
    preparing an unrefined conductive polymer microparticle dispersion by mixing the monomer dispersion with an oxidizing agent capable of producing iron ions in the solvent so as to oxidatively polymerize the one of thiophene and derivatives thereof; and
    adjusting the unrefined conductive polymer microparticle dispersion to have a pH value of 3 or greater so as to complete the conductive polymer microparticle dispersion,
    wherein the conductive polymer microparticle dispersion contains an iron compound insoluble in the solvent.

7. A method of manufacturing an electrolytic capacitor, the method comprising:
    preparing a capacitor element including a positive electrode, and a dielectric oxide film layer formed on the positive electrode;
    impregnating the capacitor element with the conductive polymer microparticle dispersion manufactured by the method of claim 6; and
    forming a conductive polymer solid electrolyte layer on the dielectric oxide film layer by a process including removal of the solvent contained in the conductive polymer microparticle dispersion.

8. The method according to claim 7, wherein the iron compound contains iron, and a concentration of the iron in the completed conductive polymer microparticle dispersion is 450 ppm or less.

9. The method according to claim 8, wherein the concentration of the iron is in a range from 20 ppm to 450 ppm, inclusive.

10. The method according to claim 6, wherein:
    the solvent includes water, and
    the iron compound insoluble in the solvent includes at least one of iron hydroxide and iron oxyhydroxide.

11. The method according to claim 6, wherein the iron compound contains iron, and a concentration of the iron in the completed conductive polymer microparticle dispersion is 450 ppm or less.

12. The method according to claim 11, wherein the concentration of the iron is in a range from 20 ppm to 450 ppm, inclusive.

13. A conductive polymer microparticle dispersion comprising:
    a solvent including water; and
    polythiophene microparticles dispersed in the solvent and containing, as a polymerization unit, one of thiophene and derivatives thereof, and a polyanion as a dopant, wherein
    the conductive polymer microparticle dispersion contains at least one iron compound selected from iron hydroxide and iron oxyhydroxide.

14. The conductive polymer microparticle dispersion according to claim 13, wherein the conductive polymer microparticle dispersion has a pH value of 3 or greater.

15. The conductive polymer microparticle dispersion according to claim 13, wherein the at least one iron compound contains iron, and a concentration of the iron in the conductive polymer microparticle dispersion is 450 ppm or less.

16. The conductive polymer microparticle dispersion according to claim 15, wherein
the concentration of the iron is in a range from 20 ppm to 450 ppm, inclusive.

17. An electrolytic capacitor, comprising:
a capacitor element including a positive electrode, a dielectric oxide film layer formed on the positive electrode, and a conductive polymer solid electrolyte layer formed on the dielectric oxide film layer; and
an outer body sealing the capacitor element,
wherein the solid electrolyte layer comprises the polythiophene microparticles contained in the conductive polymer microparticle dispersion of claim 13.

* * * * *